(12) United States Patent
Singh et al.

(10) Patent No.: US 6,718,000 B2
(45) Date of Patent: Apr. 6, 2004

(54) VENTILATED VERTICAL OVERPACK

(75) Inventors: Krishna P. Singh, Palm Harbor, FL (US); Stephen Agace, Marlton, NJ (US)

(73) Assignee: Holtec International, Inc., Marlton, NJ (US)

( * ) Notice: Subject to any disclaimer, the term of this patent is extended or adjusted under 35 U.S.C. 154(b) by 0 days.

(21) Appl. No.: 10/068,613

(22) Filed: Feb. 6, 2002

(65) Prior Publication Data
US 2003/0147486 A1 Aug. 7, 2003

(51) Int. Cl.[7] .............................................. G21F 5/008
(52) U.S. Cl. .................. 376/272; 250/506.1; 250/507.1; 250/515.1; 250/517.1; 250/518.1; 250/496.1; 250/497.1; 250/498.1
(58) Field of Search ...................... 376/272; 250/506.1, 250/507.1, 515.1, 517.1, 518.1, 496.1, 497.1, 498.1

(56) References Cited

U.S. PATENT DOCUMENTS

| | | | | |
|---|---|---|---|---|
| 4,366,095 A | * | 12/1982 | Takats et al. | 250/506.1 |
| 4,498,011 A | * | 2/1985 | Dyck et al. | 250/507.1 |
| 4,527,066 A | * | 7/1985 | Dyck et al. | 250/506.1 |
| 4,634,875 A | * | 1/1987 | Kugeler et al. | 150/506.1 |
| 4,780,269 A | * | 10/1988 | Fischer et al. | 220/23.87 |
| 4,834,916 A | * | 5/1989 | Chaudon et al. | 250/506.1 |
| 4,847,009 A | * | 7/1989 | Madle et al. | 228/184 |
| 5,102,615 A | * | 4/1992 | Grande et al. | 250/506.1 |
| 5,564,498 A | * | 10/1996 | Bochard | 165/169 |
| 5,646,971 A | * | 7/1997 | Howe | 376/272 |
| 6,064,710 A | * | 5/2000 | Singh | 250/506.1 |
| 6,252,923 B1 | * | 6/2001 | Iacovino et al. | 250/370.05 |

FOREIGN PATENT DOCUMENTS

| | | | |
|---|---|---|---|
| DE | 3144113 | * | 5/1983 |
| DE | 3404666 | * | 8/1985 |
| DE | 3515871 | * | 11/1986 |
| EP | 0253730 | * | 1/1988 |
| GB | 2337722 | * | 1/1999 |
| JP | 62-185199 | * | 8/1987 |

* cited by examiner

Primary Examiner—Michael J. Carone
Assistant Examiner—John Richardson
(74) Attorney, Agent, or Firm—Cozen O'Connor; Michael B. Fein, Esq.; Brian L. Belles, Esq.

(57) ABSTRACT

An apparatus, system, and method of storing and transferring a canister of spent nuclear fuel. In one aspect, the apparatus is a lid for a ventilated vertical overpack having a chamber for receiving spent nuclear fuel, the lid having ventilation ducts. In one aspect, the system comprises: a lid for a ventilated vertical overpack having a chamber for receiving spent nuclear fuel, the lid having ventilation ducts; and a ventilated vertical overpack having a cylindrical body including lower ventilation ducts, a bottom, and a chamber formed by the body and the bottom adapted for receiving a canister of spent nuclear fuel.

20 Claims, 11 Drawing Sheets

VENTILATED VERTICAL OVERPACK

BACKGROUND OF THE INVENTION

This invention relates to the field of storing spent nuclear fuel and specifically to a ventilated vertical overpack for storing spent nuclear fuel.

In the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

One type of storage cask is a ventilated vertical overpack ("VVO"). A VVO is a massive structure made principally from steel and concrete and is used to store a canister loaded with spent nuclear fuel. Typically, VVOs are cylindrical in shape and are extremely heavy, weighing over 150 tons and often having a height greater than 15 feet. VVOs have a flat bottom, a cylindrical body having a chamber adapted to receive a canister of spent nuclear fuel, and a removable top lid.

In using a VVO to store spent nuclear fuel, a canister loaded with spent nuclear fuel is placed in the chamber of the cylindrical body of the VVO. Because the spent nuclear fuel is still producing a considerable amount of heat when it is placed in the VVO for storage, it is necessary that this heat energy have a means to escape from the VVO chamber. This heat energy is removed from the outside surface of the canister by ventilating the VVO chamber. In ventilating the VVO chamber, cool air enters the VVO chamber through bottom ventilation ducts, flows upward past the loaded canister, and exits the VVO at an elevated temperature through top ventilation ducts. The bottom and top ventilation ducts are located circumferrentially near the bottom and top of the VVO's cylindrical body respectively.

Because it is imperative that the canister of spent nuclear fuel not be directly exposed to the external environment, the chamber has a pedestal situated at its bottom. When the canister is placed in the chamber for storage, the canister rests on the pedestal, ensuring that the canister is located at an elevation well above the openings of the bottom ventilation ducts. Additionally, the top ventilation ducts are positioned on the cylindrical body so that the openings are located well above the canister when the canister is resting on the pedestal inside the VVO chamber. Because the canister is not directly exposed to the external environment, the extent of radiation emanating through the ducts to the external environment is negligible. However, positioning the bottom ventilation ducts on the VVO body so that they are below the canister and positioning the top ventilation ducts on the VVO body so that they are above the canister results in an increased length of the VVO body. This increased length can result in the VVO being too tall to complete canister transfer operations inside a nuclear power plant building because the VVO will not fit through the door. As such, extra money must be spent either to construct an autonomous external canister transfer facility, or to enlarge the door of the power plant.

In most nuclear power plants, a canister loaded with spent nuclear fuel is transferred from a radiation pool to a VVO by a transfer cask. In transferring the loaded canister from the transfer cask to the VVO, the transfer cask is stacked atop a VVO with its lid removed so that the canister can be lowered into the VVO's chamber. During the lowering operation, the canister must pass through the elevation where the top ventilation ducts are located, creating a direct path for radiation escape. Because it is undesirable to directly expose a loaded canister of spent nuclear to the environment at any time, the openings of the top ventilation ducts on the VVO body must be closed during transfer. This is done by installing temporary shield plugs in the openings. Because these temporary shield plugs must provide ample radiation blockage, they are made of concrete and are often massive, posing logistical problems in the handling effort needed to install and remove them in the top ventilation ducts that are located at least 15 feet above the floor. For example, installing and removing four shield blocks entails eight heavy load-handling evolutions which increases the potential of a load drop mishap (and operator injury). Additionally, removal of the shield blocks following canister transfer operations increases the radiation dose exposure to the operations personnel.

Moreover, the potential for leakage of radiation through the top ventilation ducts during the lowering of the loaded canister into the VVO chamber is quite real, even with the shield plugs installed in the top ventilation ducts, because of the narrow crevice that must exist between the shield plugs and the top ventilation duct openings for tolerance reasons.

SUMMARY OF THE INVENTION

These problems and other are solved by the present invention which in one aspect is a lid for a ventilated vertical overpack having a chamber for receiving spent nuclear fuel, the lid having ventilation means. The lid can comprise a lid cap and a lid body wherein the ventilation means are located on the lid body.

Preferably, the ventilation means are one or more lid ventilation ducts. Also preferably, the lid comprises a lid shear ring and has means to secure the lid to the ventilated vertical overpack body.

In another aspect, the invention is a system for storing spent nuclear fuel comprising the lid as described above and a ventilated vertical overpack having a cylindrical body including lower ventilation ducts, a bottom, and a chamber formed by the body and the bottom adapted for receiving a canister of spent nuclear fuel.

Preferably, the lower ventilation ducts are located on the cylindrical body near the bottom and there are no upper ventilation ducts included on the cylindrical body of the overpack. Also preferably, the lid is secured to the overpack by bolts that extend through the lid and threadily engage the overpack body.

The system's lid can comprise a lid cap which substantially encloses the chamber and a lid body in which the upper ventilation means are located. The ventilation means in the lid of the system are preferably one or more lid ventilation ducts. Preferably, the system's lid has a lid shear ring and the cylindrical body has a top surface having a body shear ring, wherein the lid shear ring engages the body shear ring when the lid is placed on the cylindrical body, restricting lateral movement of the lid with respect to the cylindrical body.

Also preferably, when the canister of spent nuclear fuel is received in the overpack and the lid is secured, air within the chamber is warmed by heat from the spent nuclear fuel, cold air entering through the lower ventilation ducts and warmed air exiting through the ventilation means of the lid.

In yet another aspect, the invention is a method of storing spent nuclear fuel comprising placing a canister of spent nuclear fuel in the chamber of the overpack of the system described above; and securing the lid so that air within the chamber is warmed by heat from the spent nuclear fuel, cold air entering through the lower ventilation ducts and warmed air exiting through the ventilation means of the lid. Preferably, the lid is secured to the body of the overpack by bolting it thereto. Also preferably in the method, the lid has a lid shear ring and the cylindrical body has a top surface having a body shear ring, wherein lateral movement of the lid with respect to the cylindrical body is restricted when the lid is placed on the cylindrical body.

DETAILED DESCRIPTION

Figure 1:
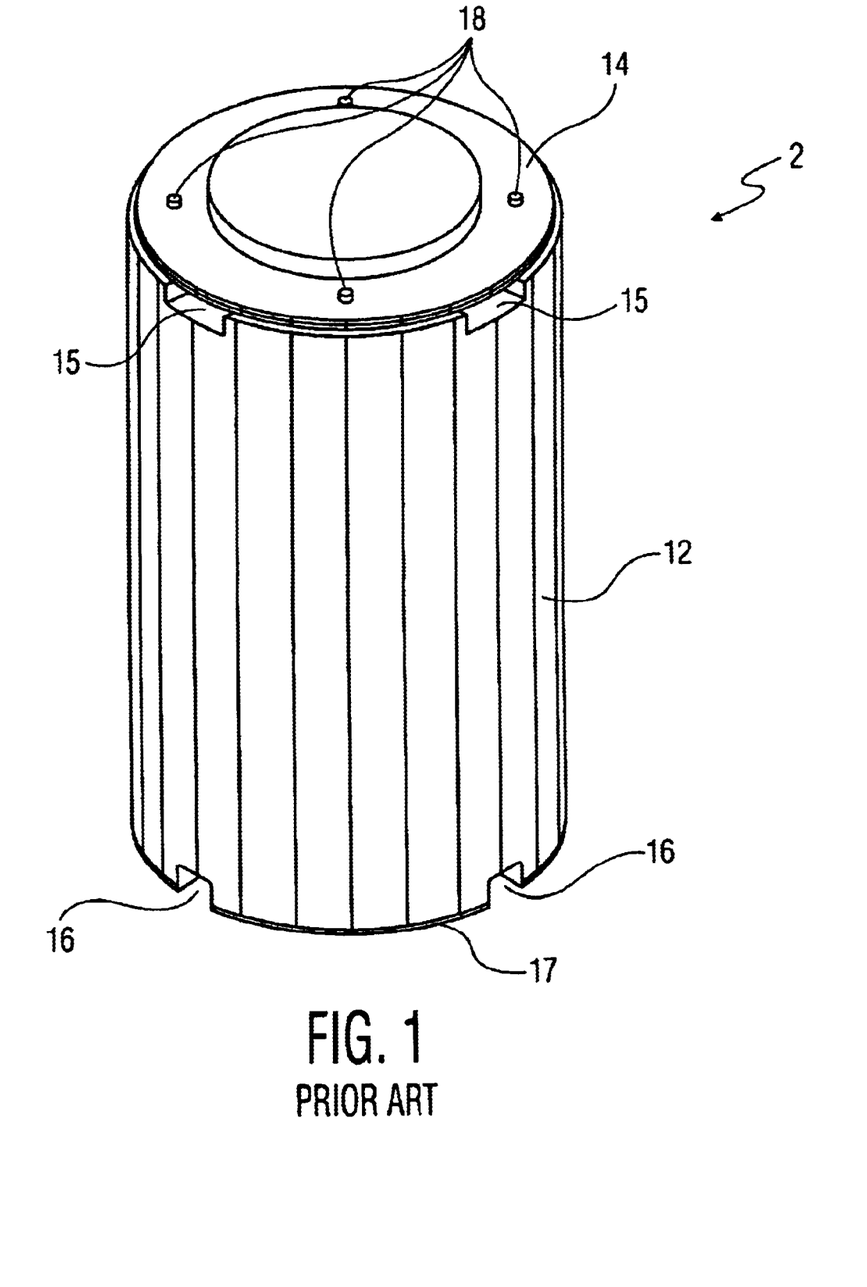
FIG. 1 is a perspective view of a prior art ventilated vertical overpack ("VVO").

FIG. 1 illustrates prior art ventilated vertical overpack ("VVO") 2. Prior art VVO 2 comprises flat bottom 17, cylindrical body 12, and lid 14. Lid 14 is secured to cylindrical body 12 by bolts 18. Bolts 18 also serve to restrain lateral sliding of lid 14 with respect to cylindrical body 12 if prior art VVO 2 were to tip over. Cylindrical body 12 has top ventilation ducts 15 and bottom ventilation ducts 16. Top ventilation ducts 15 are located at or near the top of cylindrical body 12 while bottom ventilation ducts 16 are located at or near the bottom of cylindrical body 12. Both bottom ventilation ducts 16 and top ventilation ducts 15 are located around the circumference of the cylindrical body 12.

Figure 2:
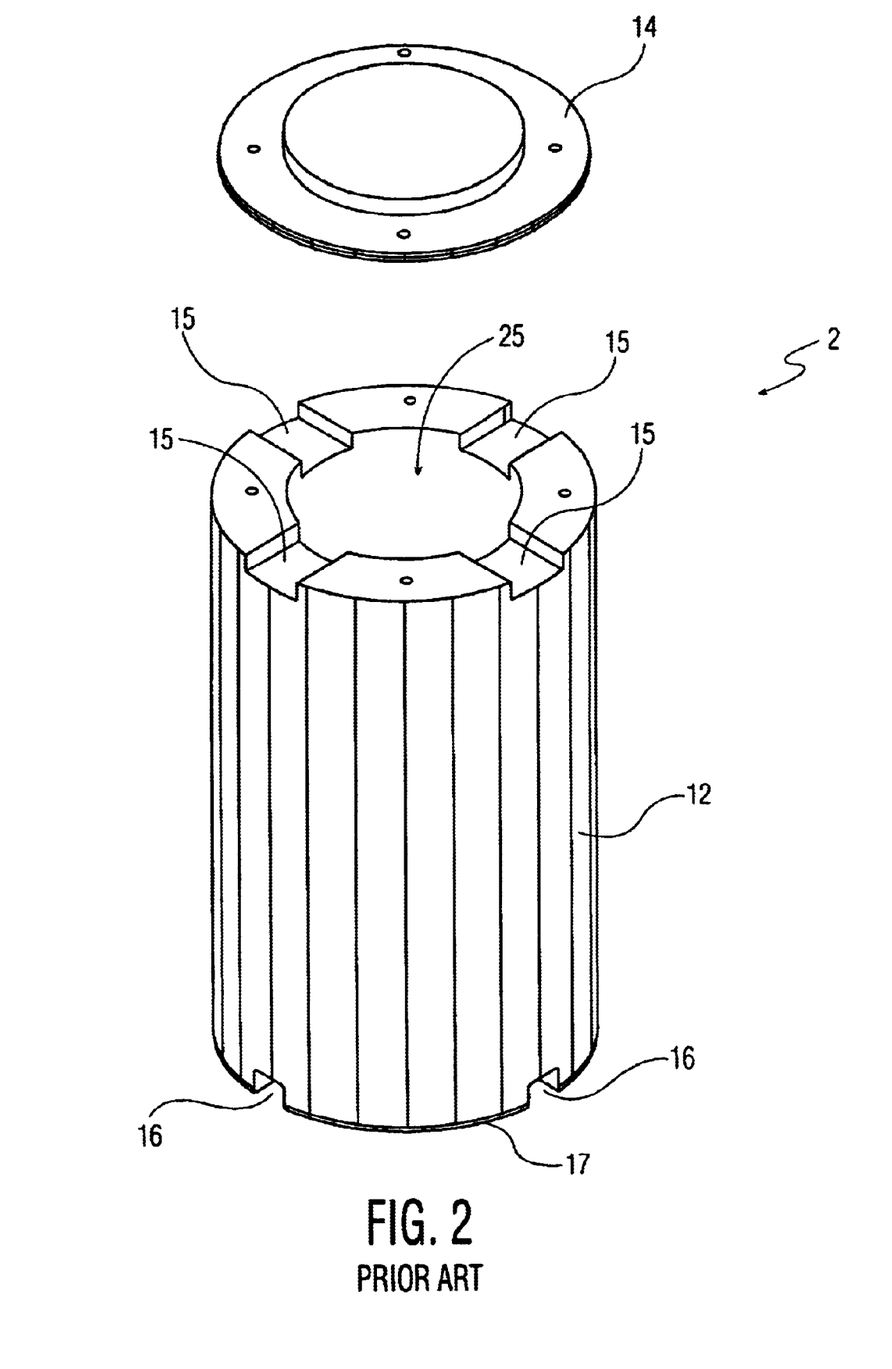
FIG. 2 is a perspective view of the prior art VVO with its lid removed.

Referring to FIG. 2, cylindrical body 12 of prior art VVO 2 forms chamber 25. Chamber 25 is adapted so as to be capable of receiving a canister loaded with spent nuclear fuel when lid 14 is removed.

Figure 3:
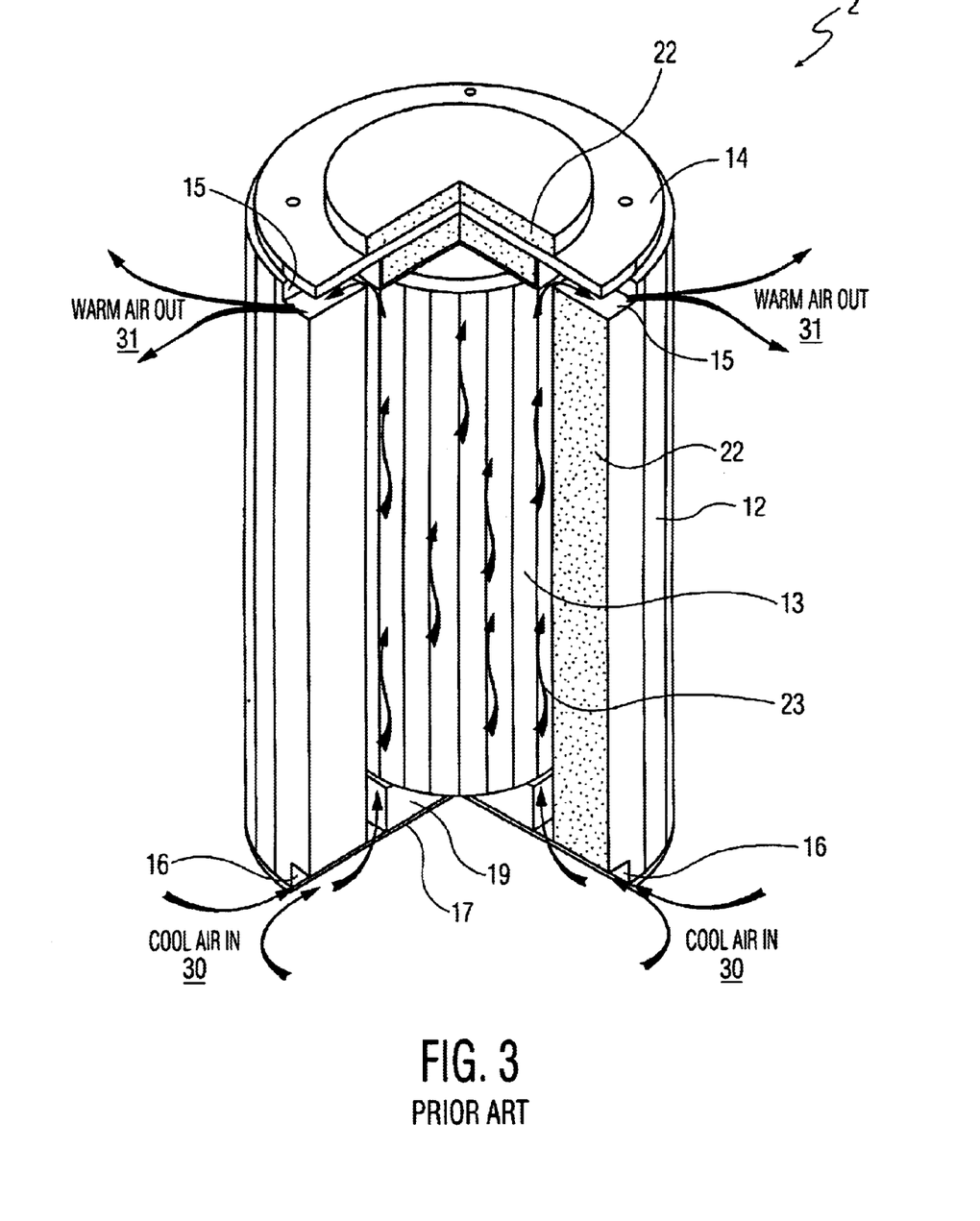
FIG. 3 is a perspective view partially in section of the prior art VVO with a canister of spent nuclear fuel fully inserted therein and showing ventilation of the canister.

Referring to FIG. 3, prior art VVO 2 is illustrated partially in section with canister 13 loaded in chamber 25 for storage. Prior art VVO 2 has pedestal 19 located at the bottom of chamber 25. When canister 13 is placed in chamber 25 of prior art VVO 2 for storage, canister 13 rests on pedestal 19. Bottom ventilation ducts 16 are positioned on cylindrical body 12 so that canister 13 is above the elevation of bottom ventilation ducts 16 when canister 13 is placed in chamber 25. Top ventilation ducts 15 are positioned on cylindrical body 12 so that canister 13 is below the elevation of top ventilation ducts 15 when canister 13 is placed in chamber 25. This positioning mitigates the extent of radiation emanating through both bottom ventilation ducts 16 and top ventilation ducts 15 to the external environment. Cylindrical body 12 and portions of lid 14 are made of gamma absorbing material such a concrete 22.

When lid 14 is secured to cylindrical body 12 with canister 13 resting in chamber 25, ventilation of chamber 25 (and thus cooling of the spent nuclear fuel) must occur. In prior art VVO 2, cold air 30 enters bottom ventilation ducts 16, flows upward passed canister 13 removing heat energy form canister 13 by convention, and exits prior art VVO 2 as warm air 31 through top ventilation ducts 15.

Figure 4:
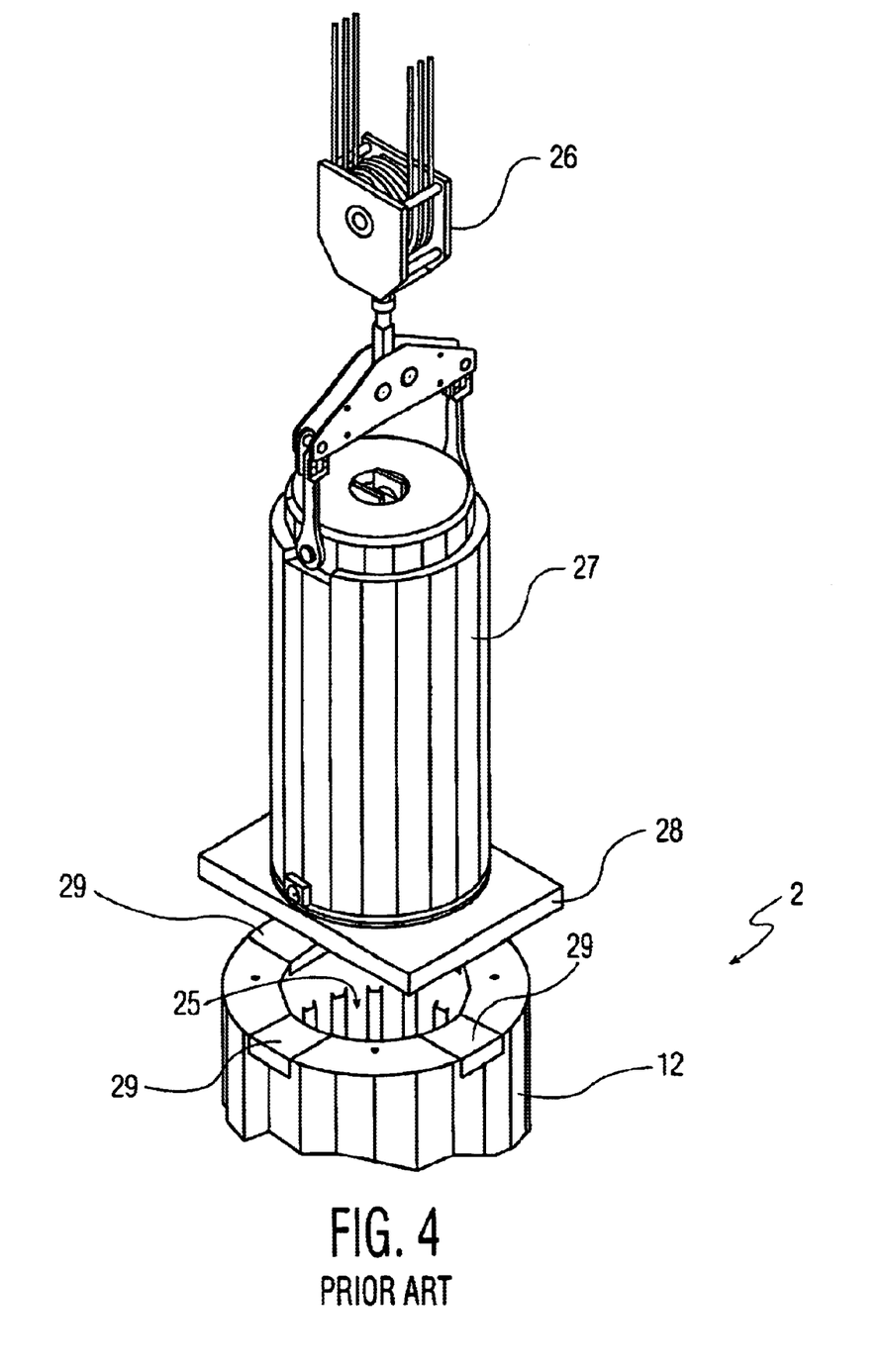
FIG. 4 is perspective view of a transfer cask being placed atop a partially shown prior art VVO with shield plugs in place.

Referring to FIG. 4, in order to transfer loaded canister 13 from transfer cask 27 to prior art VVO 2, transfer cask 27 is positioned above and stacked atop prior art VVO 2 by overhead crane 26.

Figure 5:
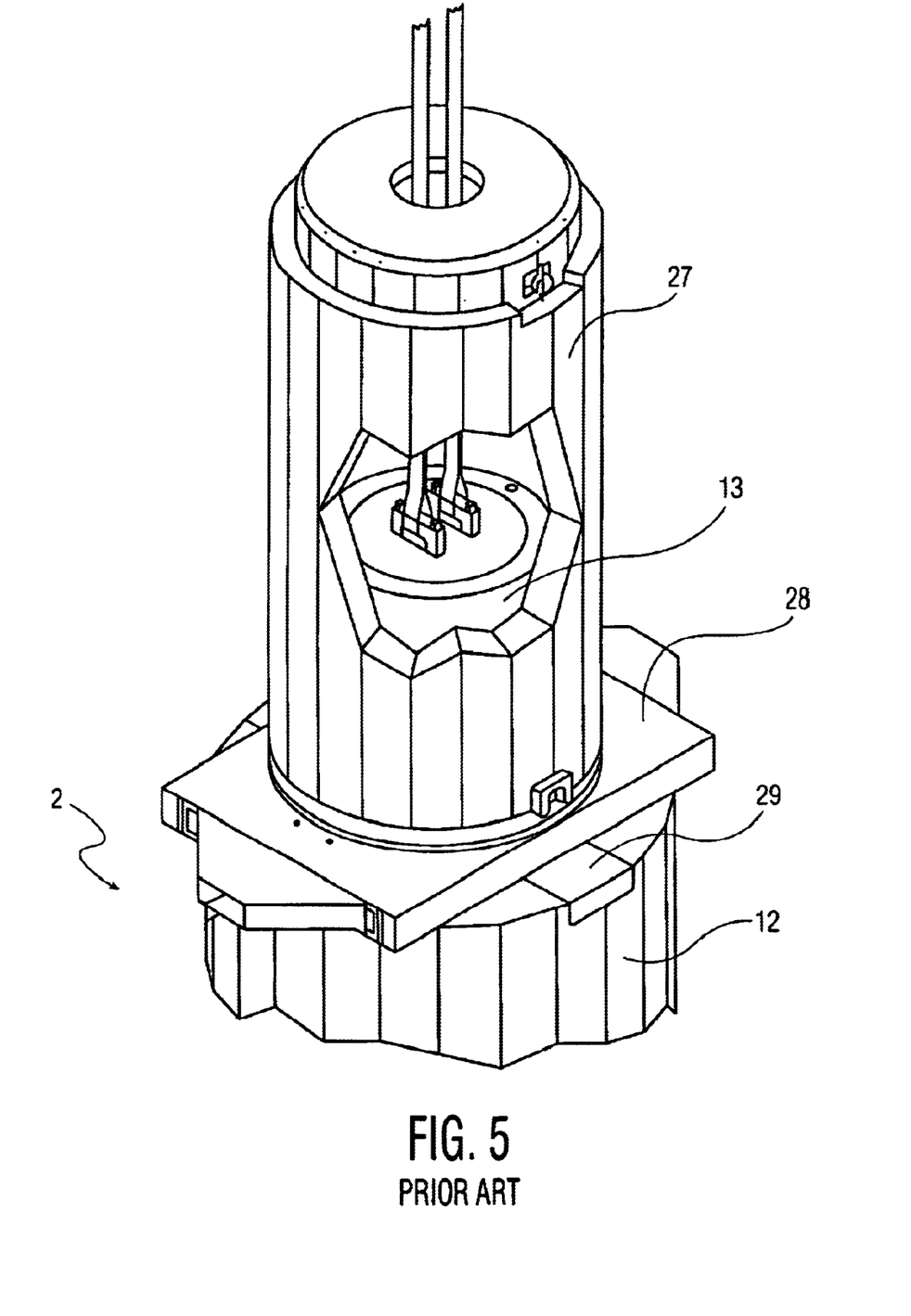
FIG. 5 is a cut-away view of a transfer cask secured atop a prior art VVO showing a canister being lowered into the partially shown prior art VVO with shield plugs in place.

Referring to FIG. 5, transfer cask 27 has a retractable bottom 28 capable of opening so that loaded canister 13 can be lowered directly into chamber 25 of prior art VVO 2 while transfer cask 27 is stacked atop and secured to prior art VVO 2. During this lowering operation, canister 13 will pass by top ventilation ducts 15 (FIG. 1), creating a direct path for radiation to escape.

Figure 6:
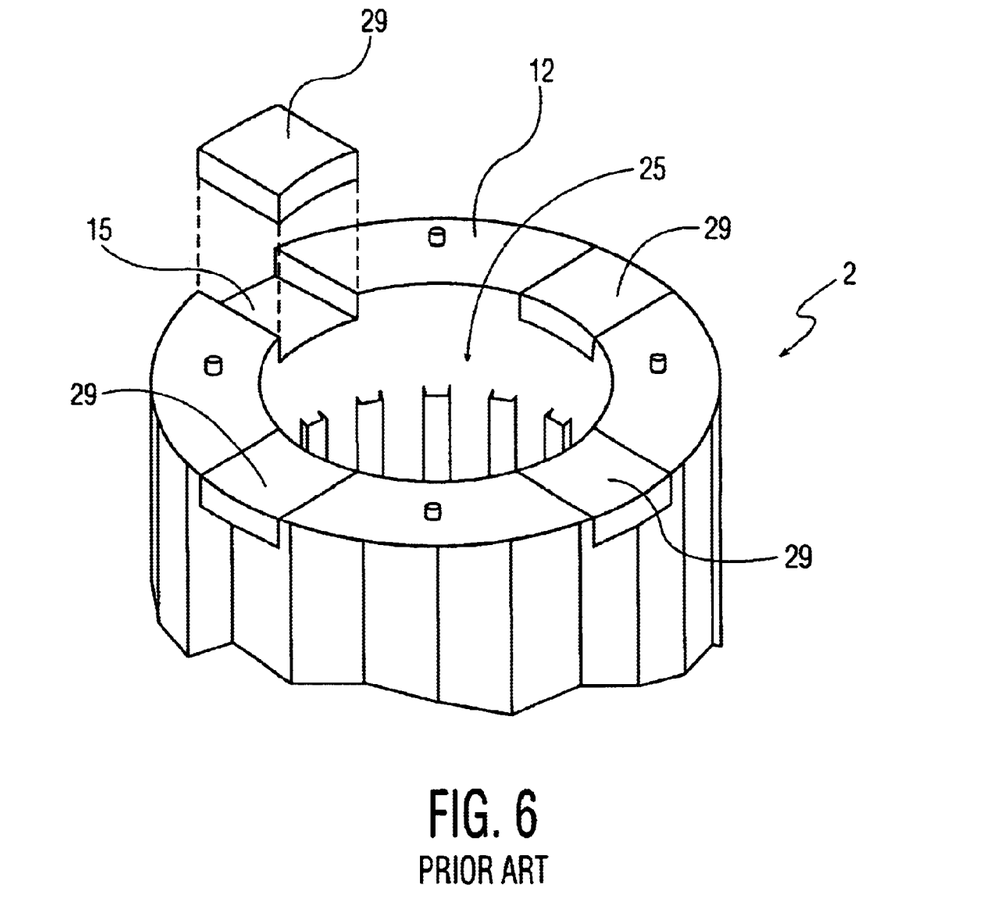
FIG. 6 is a perspective view of the top portion of a prior art VVO with temporary shield plugs being installed in top ventilation duct openings.

Referring to FIG. 6, in order to block this radiation from escaping through top ventilation ducts 15 during lowering, temporary shield plugs 29 are installed in the openings of top ventilation ducts 15 before transfer cask 27 is positioned above prior art VVO 2. Temporary shield plugs 29 are made of gamma absorbing material such as concrete.

Figure 7:
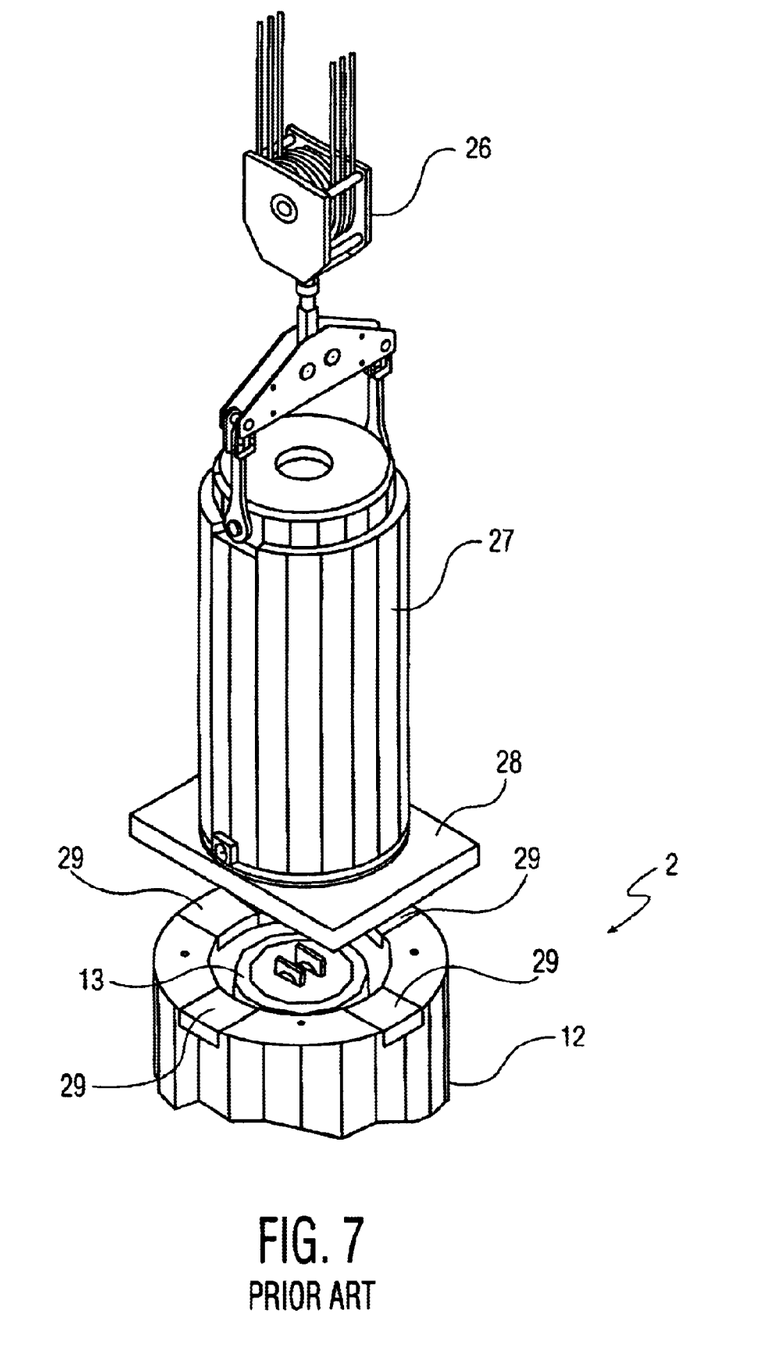
FIG. 7 is a perspective view of a transfer cask being removed from a partially shown prior art VVO after a canister has been transferred from the transfer cask to the prior art VVO.

Referring to FIG. 7, upon fully lowering canister 13 into prior art VVO 2, transfer cask 27 is removed. Temporary shield plugs 29 must then be removed before lid 14 is again secured to cylindrical body 12 so that chamber 25 can be properly ventilated. Once temporary shield plugs 29 are removed, lid 14 is secured to cylindrical body 12 by bolts 18 (FIG. 1).

Figure 8:
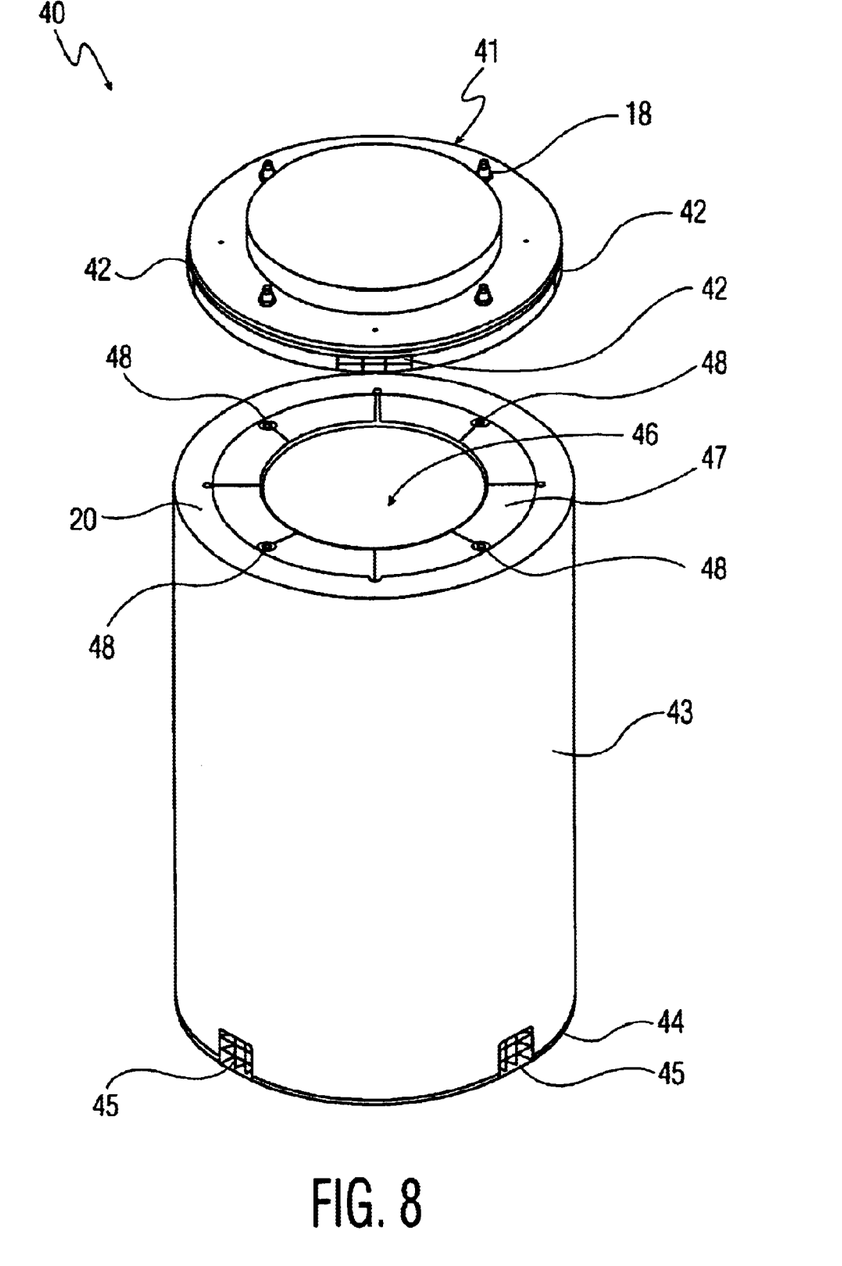
FIG. 8 is a perspective view of the ventilated vertical overpack of the present invention having upper ventilation ducts in its lid.

FIG. 8 illustrates an embodiment of the system of the present invention, ventilated vertical overpack ("VVO") 40. Ventilated vertical overpack 40 comprises cylindrical body 43, bottom 44, and ventilated lid 41. Cylindrical body 43 and bottom 44 form chamber 46 which is capable of receiving a canister of spent nuclear fuel. Cylindrical body 43 also has lower ventilation ducts 45 located at or near the bottom of cylindrical body 43 for ventilating chamber 46. However, unlike cylindrical body 12 of prior art VVO 2 (FIG. 1), cylindrical body 43 of VVO 40 does not have upper ventilation ducts located at or near its top. Instead, ventilated lid 41 has one or more lid ventilation ducts 42 for ventilating chamber 46.

Figure 9:
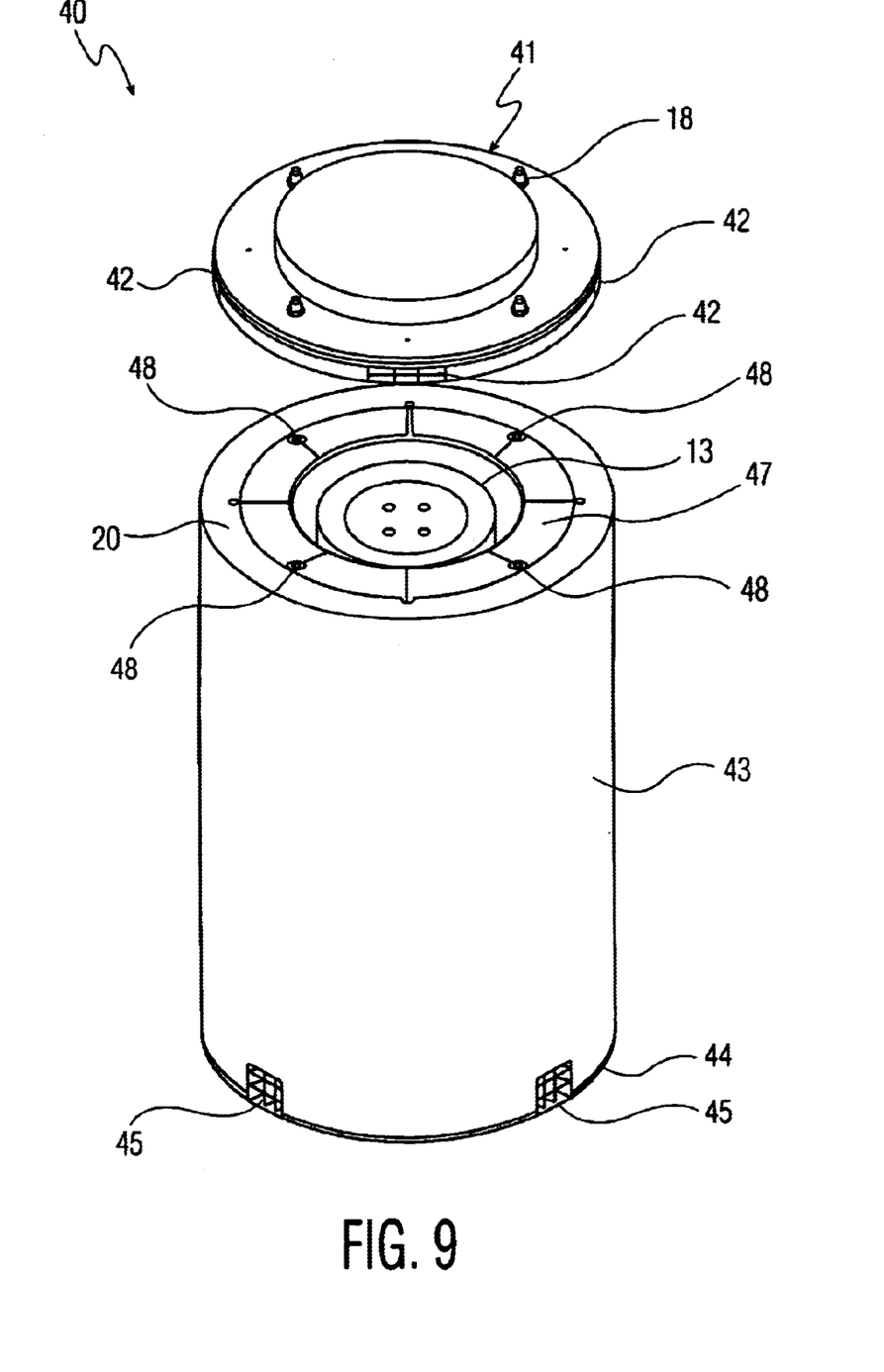
FIG. 9 is a perspective view of the ventilated vertical overpack of the present invention having upper ventilation ducts in its lid and having a canister fully inserted in the chamber of the ventilated vertical overpack body.

Referring to FIG. 9, because cylindrical body 43 does not have upper ventilation ducts, top surface 47 of cylindrical body 43 is approximately a flat horizontal surface, providing a gamma absorbing shield all around its top. As such, when canister 13 is fully lowered into chamber 46, cylindrical body 43 does need to extend taller than canister 13 to ensure that radiation does not emanate directly into the external environment. Moreover, this flat top surface 47 eliminates the need for installing temporary shield plugs 29 (FIG. 6) during canister 13 lowering operations being that there are no openings through which radiation can escape once a transfer cask is properly secured to top surface 47. However, as in the prior art VVO 2 (FIG. 1.), lower ventilation ducts 45 are positioned on cylindrical body 43 elevationally below canister 13 when canister 13 is placed in chamber 46. Body shear ring 20 is attached to top surface 47. Body shear ring 20 has an upper surface that is also a substantially flat horizontal surface.

Loaded canister 13 of spent nuclear fuel is stored in VVO 40 by placing canister 13 in chamber 46 (FIG. 8) of ventilated vertical overpack 40 and securing ventilated lid 41 to cylindrical body 43 so that the air within chamber 46 is warmed by the heat of the spent nuclear fuel, cold air enters through lower ventilation ducts 45 and exits as warmed air through the lid ventilation ducts 42. Ventilated lid 41 can also be bolted to cylindrical body 43.

Figure 10:
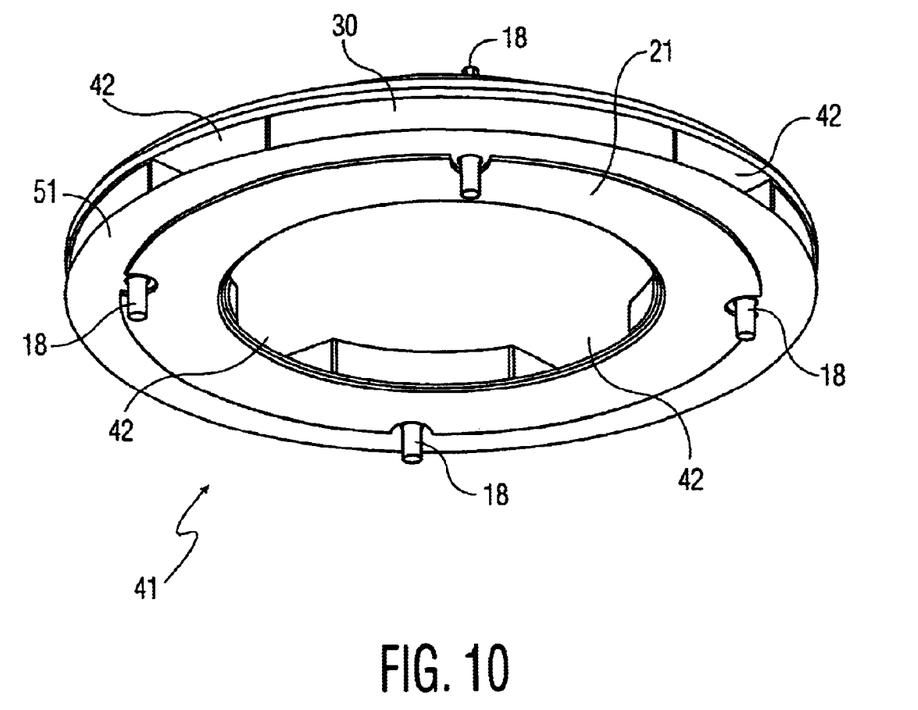
FIG. 10 is a bottom perspective view of the ventilated lid apparatus of the present invention.

Referring to FIG. 10, ventilation lid 41 has four lid ventilation ducts 42 on side wall 30. Ventilated lid 41 has a bottom surface 51 that is a substantially flat horizontal surface. Ventilation lid 41 also comprises lid shear ring 21 attached to bottom surface 51. Lid shear ring 21 has a lower surface that is a substantially flat horizontal surface. Referring to FIG. 9, cylindrical body 43 has body shear ring 20 secured to its top surface 47. When ventilated lid 41 is placed atop cylindrical body 43, the lower surface of lid shear ring 21 (FIG. 10) contacts top surface 47 to form a first substantially horizontal interface. Concurrently, the upper surface of body shear ring 20 contacts bottom surface 51 of ventilated lid 41 to form a second substantially horizontal interface. As such, lid shear ring 21 and body shear ring 20 interact to restrain lateral motion of ventilated lid 41 with respect to cylindrical body 43, even if bolts 18 are not secured. Ventilated lid 41 is secured to cylindrical body 43 by extending bolts 18 through ventilated lid 41 and threadily engaging bolt holes 48 of cylindrical body 43. Alternatively, shear rings do not have to be used. In this alternative embodiment, the bottom surface of the lid and the top surface of the overpack body will be in direct contact so as to form a substantially horizontal interface.

Figure 11:
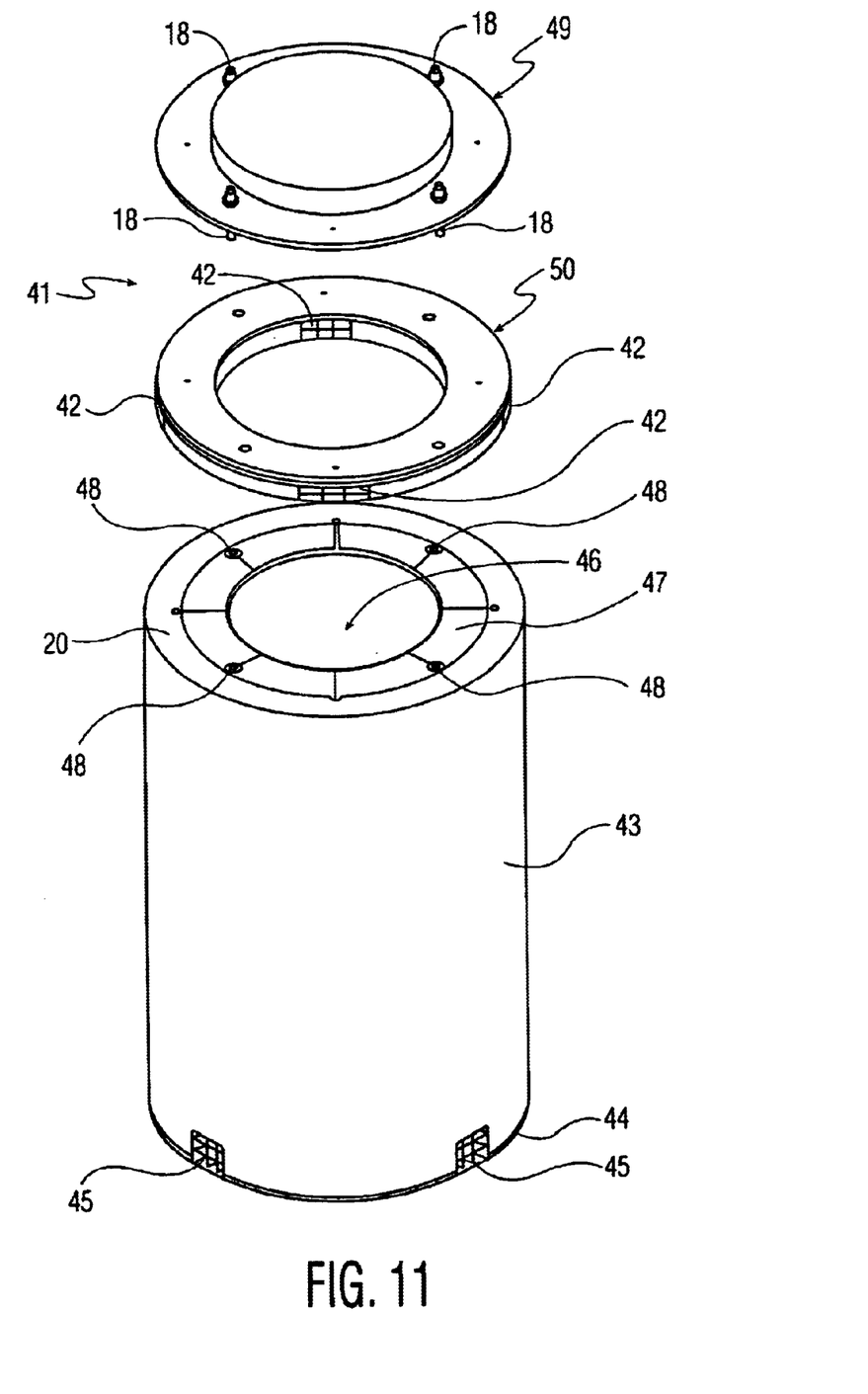
FIG. 11 is perspective view of the ventilated vertical overpack of the present invention wherein the ventilated lid comprises a lid body and a lid cap.

Referring to FIG. 11, ventilated lid 41 can be constructed so that ventilated lid 41 comprises two pieces, lid cap 49 that substantially encloses chamber 46 and lid body 50 which contains the means to ventilate chamber 46, illustrated as lid ventilation ducts 42. Lid ventilation ducts 42 are located within side wall 30 (FIG. 10) of lid body 50. When constructed as lid cap 49 and lid body 50, lid cap 49 can be removed from cylindrical body 43 without removing lid body 50. In such an embodiment, lid body 50 is an annular ring-like structure capable of being removed and secured to cylindrical body 43 independent of lid cap 49. Alternatively, ventilated lid 41 can be constructed so that it is one rigid piece that must be removed in its entirety.

The foregoing discussion discloses and describes merely exemplary embodiments of the present invention. As will be understood by those skilled in this art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for storing spent nuclear fuel comprising:
    a lid having a side wall with substantially horizontal ventilation means extending through the side wall, the lid having a bottom surface;
    a ventilated vertical overpack having a body including lower ventilation ducts, a bottom, a top surface, and a chamber formed by the body and the bottom adapted for receiving a canister of spent nuclear fuel; and
    wherein the lid is secured to the overpack by a plurality of fasteners so that the bottom surface of the lid and the top surface of the overpack form an interface comprising a substantially horizontal section.

2. A system for storing spent nuclear fuel comprising:
    a lid having a side wall with substantially horizontal ventilation means extending through the side wall, the lid having a bottom surface;
    a ventilated vertical overpack having a body including lower ventilation ducts a bottom, a top surface, and a chamber formed by the body and the bottom adapted for receiving a canister of spent nuclear fuel;
    a lid shear ring having a lower surface attached to the bottom surface of the lid;
    a body shear ring having an upper surface attached to the top surface of the overpack; and
    the lid being secured to the overpack by a plurality of fastener so that the upper surface of the body shear ring contacts the bottom surface of the lid forming a first substantially horizontal interface and the lower surface of the lid shear ring contacts the top surface of the overpack forming a second substantially horizontal interface.

3. The system of claim 1 wherein when the canister of spent nuclear fuel is received in the overpack and the lid is secured, air within the chamber is warmed by heat from the spent nuclear fuel, cold air entering through the lower ventilation ducts and warmed air exiting through the ventilation means of the lid.

4. A method of storing spent nuclear fuel comprising:
    placing a canister of spent nuclear fuel in a chamber of an overpack of a system comprising a lid having a side wall with substantially horizontal ventilation means extending through the side wall, the lid having a bottom surface, the overpack having a body including lower ventilation ducts, a bottom, and a top surface, the chamber being formed by the body and the bottom, wherein the lid is secured to the overpack by a plurality of fasteners; and
    securing the lid to the overpack so that the bottom surface of the lid and the top surface of the overpack form an interface comprising at least one substantially horizontal section so that air within the chamber is warmed by heat from the spent nuclear fuel, cold air entering through the lower ventilation ducts and warmed air exiting through the ventilation means.

5. The method of claim 4 wherein the fasteners are bolts and the securing step comprises bolting the lid to the overpack.

6. The system of claim 1 wherein the lower ventilation ducts are located in the body near the bottom and no upper ventilation ducts are included in the body of the overpack.

7. The system of claim 2 wherein the lower ventilation ducts are located in the body near the bottom and no upper ventilation ducts are included in the body of the overpack.

8. The system of claim 2 wherein the body of the overpack is cylindrical.

9. The system of claim 1 wherein the lid comprises a lid cap and a lid body.

10. The system of claim 9 wherein the lid body is an annular ring.

11. The system of claim 1 wherein the body of the overpack is cylindrical.

12. The system of claim 1 wherein the fasteners are bolts extending through the lid and threadily engaging the overpack.

13. The system of claim 1 wherein the ventilation means are four ventilation ducts.

14. The system of claim 2 wherein the lid shear ring engages the body shear ring so as to prevent lateral movement of the lid with respect to the overpack.

15. The system of claim 2 wherein the lid comprises a lid body and a lid cap.

16. The system of claim 15 wherein the lid body is an annular ring.

17. The system of claim 2 wherein the fasteners are bolts extending through the lid and threadily engaging the overpack.

18. The system of claim 2 wherein the ventilation means are four ventilation ducts.

19. A method of storing spent nuclear fuel comprising:

placing a canister of spent nuclear fuel in a chamber of an overpack of a system comprising a lid having a side wall with substantially horizontal ventilation means extending through the side wall, the lid having a bottom surface and a lid shear ring having a lower surface attached to the bottom surface, the overpack having a body including lower ventilation ducts, a bottom, a top surface, and a body shear ring having an upper surface attached to the top surface, the chamber being formed by the body and the bottom; and securing the lid to the overpack with a plurality of fasteners so that the lower surface of the lid shear ring contacts the top surface of the overpack forming a first substantially horizontal interface, and the upper surface of the body shear ring contacts the bottom surface of the lid forming a second substantially horizontal interface so that air within the chamber is warmed by heat from the spent nuclear fuel, cold air entering through the lower ventilation ducts and warmed air exiting through the ventilation means.

20. The method of claim 19 wherein the fasteners are bolts and the securing step comprises bolting the lid to the overpack.

* * * * *